(12) United States Patent
Boone et al.

(10) Patent No.: US 9,344,585 B1
(45) Date of Patent: May 17, 2016

(54) IMAGE COORDINATION IN A FLEET OF DISPARATE IMAGING DEVICES

(71) Applicant: Lexmark International, Inc., Lexington, KY (US)

(72) Inventors: Billy Brian Boone, Louisville, KY (US); Richard Francis Russell, Pittsburgh, PA (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 0 days.

(21) Appl. No.: 14/560,301

(22) Filed: Dec. 4, 2014

(51) Int. Cl.
*H04N 1/00* (2006.01)

(52) U.S. Cl.
CPC ......... *H04N 1/00058* (2013.01); *H04N 1/0005* (2013.01); *H04N 1/00005* (2013.01); *H04N 1/00042* (2013.01); *H04N 1/00076* (2013.01); *H04N 1/00411* (2013.01)

(58) Field of Classification Search
CPC ............ H04N 1/00058; H04N 1/0005; H04N 1/00042; H04N 1/00076; H04N 1/00411; H04N 1/00005
See application file for complete search history.

(56) References Cited

U.S. PATENT DOCUMENTS

| | | | |
|---|---|---|---|
| 8,934,117 B2* | 1/2015 | Zhang | H04L 41/046 358/1.13 |
| 2013/0132337 A1* | 5/2013 | Masuda | G06Q 10/10 707/609 |

* cited by examiner

*Primary Examiner* — Kristy A Haupt

(57) ABSTRACT

Apparatus and methods coordinate imaging in a fleet of disparate imaging devices. Each imaging device is associated to a unique identifier. Imaging volumes are gathered for each device in advance of a user walkthrough past the fleet. The volumes are averaged over a predetermined time period and displayed to the user during their walkthrough on a handheld computing device. A confidence factor is included so the user can ascertain reliability of the volume averages. The handheld computing device provides the user real-time knowledge of the fleet to better coordinate managed print services, for example. The handheld computing device is also configured to receive partial data from the user and in response provide selectable options corresponding to an identity of the imaging devices as standardized by third party reference data, for instance. Embodiments typify user interfaces, user actions, data, and computing applications, to name a few.

20 Claims, 5 Drawing Sheets

FIG. 4

| | | 🞶 🔕 🔋 12:02PM |
|---|---|---|
| ⚙ | | ▭ 📷 🖼 |

| | | | |
|---|---|---|---|
| Reference Search | | | |
| Manufacturer | H | | |
| Model | 81 | | |
| Primary Function | MFP | | ▲ |
| In Scope | ☑ | Network | ☑ |
| Color | ☑  92 | A3 | ☐ |
| Total Count (Meter) | 200033 94 | 102  104 | |
| | 96 ⎯ Mono: 116,683 | AMV: 1,341 (51 Days) | |
| | Color: 83,350 | AMV: 1,341 (51 Days) | |
| Reference Data Dec 17, 2013 | Scan: 36,689 | AMV: 1,341 (51 Days) | |
| | 98 Duplex: 6,398 | AMV: 1,341 (51 Days) | |
| Serial #  100 | 7562029400MVG | | |
| Asset # | | | |
| IP Address | 10.128.201.74 | | |
| Location / Dept | I | | |
| Room | | | |
| Comments | | | |
| Fax | | | |
| Recommendation | ● None   ○ Keep   ○ Replace | | |
| Placement | | | ▲ |
| # of Trays | ● 0   ○ 1   ○ 2   ○ 3   ○ 4 | | |
| Cancel | | Add | |

90 — (bracket)
106 — (pointer)

FIG. 5

IMAGE COORDINATION IN A FLEET OF DISPARATE IMAGING DEVICES

FIELD OF THE EMBODIMENTS

The present disclosure relates to managing imaging devices. It relates further to coordinating imaging in a fleet of disparate imaging devices. Handheld computing devices assist a user during a walkthrough past the fleet as the user reconciles devices-in-use to reference data and coordinates historical imaging inventories. Page volume information from the devices and standardized model identification typifies the embodiments.

BACKGROUND

In managed print service (MPS) environments, imaging devices of an entity are aggregated together in a network to coordinate imaging, e.g., printing, copying, faxing, etc., and enforce policy. Invariably, the imaging devices are of disparate makes and models. They have different ages and expected lifetimes and possess different imaging capacities and functions. The devices typify printers, copiers, multi-function printers (MFPs), fax machines, etc. and execute imaging in monochrome and/or color. In a fleet of imaging devices, it is not uncommon to have dozens, hundreds or thousands of devices. They reside scattered throughout floors of offices, labs, cubicles, etc. in a campus of buildings.

When considering joining an MPS program, entities balance the upfront cost of paying for new service with the later savings that comes from fewer imaging operations, often as much as thirty percent or more. Factors influencing the decision to join a program are founded upon assessment of the existing imaging infrastructure. Assessment includes identifying imaging devices, defining their whereabouts, and determining capacities. It is also necessary to evaluate network features, such as bandwidth, speed, latency, etc. and determining hardware components, such as routers, switches, and the like. To do this, an evaluator conducts a campus walkthrough and notes the details of each imaging device and its network. Although accurate information provides better estimates of ownership cost in an MPS engagement, the data available to the evaluator is not always straightforward or easy to get.

For instance, an evaluator might print a test page from an imaging device that identifies itself as a Hewlett Packard Laser Jet "LJ 8150." To assess costs for the device such as the original purchase price, toner, and the length of time the device might have been used in the customer environment, reference is often taken to the data provided by Buyers Laboratory, Inc. (BLI), or some other industry guide providing competitive data in the imaging arts. In the BLI data for "LJ 8150," however, the following models are found: HP LaserJet 8150; HP LaserJet 8150n; HP LaserJet 8150dn; HP LaserJet 8150hn; and HP LaserJet 8150mfp. Each has its own unique pricing, capabilities, and introduction dates. Choosing the correct model is necessary for accurate analysis. Yet, when an evaluator reconciles its test page printout Hewlett Packard Laser Jet "LJ 8150" to the BLI data, sometimes days later, it can be confusing to know exactly which model of "LJ 8150" was present in the customer's environment. A need exists to overcome this problem.

Evaluators also like to associate capacity to specific imaging devices. By knowing imaging volumes of a printer, MFP, copier, etc., evaluators can make informed judgments regarding the effective utilization of devices, such as whether they should be replaced or have their imaging operations modified. Devices whose print capacities far exceed their average print volume are underutilized, for example, while devices whose print capacities are stretched by their average print volumes are over-utilized. Either situation is inefficient. Since evaluators often receive volume information from IT departments on reams of hardcopy printouts, they have little to no understanding of device capacity while on their walkthrough past the fleet. A further need exists to solve this problem.

SUMMARY

The above-mentioned and other problems are solved by imaging coordination in a fleet of disparate imaging devices. Each imaging device is associated to a unique identifier. Imaging volumes are gathered for each device in advance of a user walkthrough past the fleet. The volumes are averaged over a given time period and displayed on a handheld computing device to the user during their walkthrough. A confidence factor is included so the user can ascertain reliability of the volume averages. The handheld computing device provides the user real-time knowledge of the fleet to better propose an effective deployment of imaging assets, for example. The handheld computing device is also configured to receive partial data from the user and, in response, provide selectable options corresponding to an identity of the imaging devices as standardized by reference data of third parties, such as Buyers Laboratory. Embodiments typify user interfaces, user actions, data, and computing applications, to name a few.

These and other embodiments are set forth in the description below. Their advantages and features will become readily apparent to skilled artisans. The claims set forth particular limitations.

BRIEF DESCRIPTION OF THE DRAWINGS

FIGS. 4 and 5 are screen shots of an application on a handheld computing device for a user during a walkthrough past a fleet of disparate imaging devices revealing imaging volumes for a uniquely identified imaging device, including a confidence factor regarding the imaging volumes.

DETAILED DESCRIPTION OF THE ILLUSTRATED EMBODIMENTS

In the following detailed description, reference is made to the accompanying drawing where like numerals represent like details. The embodiments are described to enable those skilled in the art to practice the invention. It is to be understood that other embodiments may be utilized and that changes may be made without departing from the scope of the invention. The following, therefore, is not to be taken in a limiting sense and the scope of the embodiments is defined only by the appended claims and their equivalents. In accordance with the features of the invention, methods and apparatus teach image coordination in a fleet of disparate imaging devices.

Figure 1:
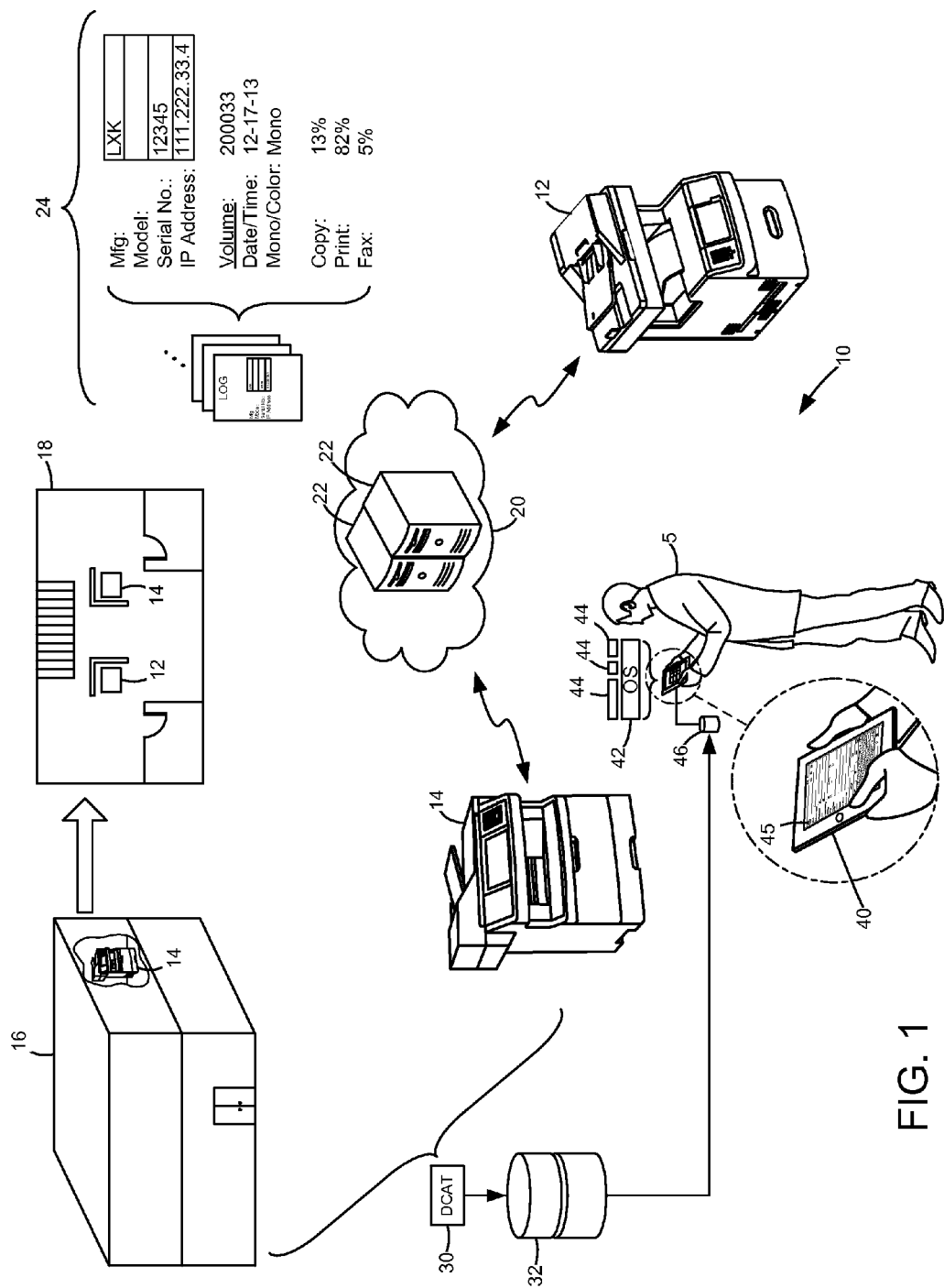
FIG. 1 is a diagrammatic view of a computing system environment for image coordination in a fleet of disparate imaging devices according to the present disclosure.

With reference to FIG. 1, a user 5 conducts a walkthrough past a fleet 10 of disparate imaging devices 12, 14. The devices reside in a campus of one or more buildings 16 of an entity. The entity seeks to enroll in a Managed Print Services (MPS) program. Floors, offices, labs, etc. of the building house the imaging devices and have corresponding maps/floor plans 18. The whereabouts of the imaging devices 12, 14 are noted on the floor plans. Users adjust their positions as needed. Users can also take a picture with a camera of the handheld computing device and tack that to the location of the device. Administrative data can be entered too.

The imaging devices exist in a computing network 20. The network includes one or more servers 22. The servers function to provide services to the imaging devices and other computing devices of the entity, such as clients (not shown). Data can be gathered by the servers. This includes logs 24 of information reporting the inventories and activities of the imaging devices. The logs identify the imaging device in some fashion, such as by manufacturer name (mfg), model, serial number and/or internet protocol (IP) address. The log also includes imaging volumes for a lifetime of the devices and can be itemized according to a period of time, such as day, week, month, year, etc. The volumes can be expressed in a number of ways, but certainly as a total number (i.e., 200033) of imaging operations and delineated by particulars such as date/time of occurrence, monochrome or color imaging, and/or event types of copying, printing, faxing, or the like. Lexmark International, Inc.'s, Markvision Enterprise is but one type of logging service. As is known, it provides the ability to track and monitor a fleet of tens, hundreds, or even thousands of imaging devices, regardless of the manufacturer of each device.

At 30, the maps/floor plans 18, logs 24 and information about the entity are provided to a Data Collection and Analysis Tool (DCAT). The DCAT harmonizes the information provided to it into a common language, format, etc. for the various entities. Such is accumulated and stored in a searchable database 32. The database is pushed to a handheld computing device 40 for the user, such as a tablet, smart phone, etc. The handheld computing device has an operating system 42 hosting one or more applications 44. The applications retrieve the information of the database from a local storage device, such as memory 46. The user 5 now has immediate access to the maps/floor plans 18 and the inventories of imaging devices during their walkthrough past the fleet. The user interface 45 displays the information to the user and the user can interact with the screens as shown below.

Figure 2:
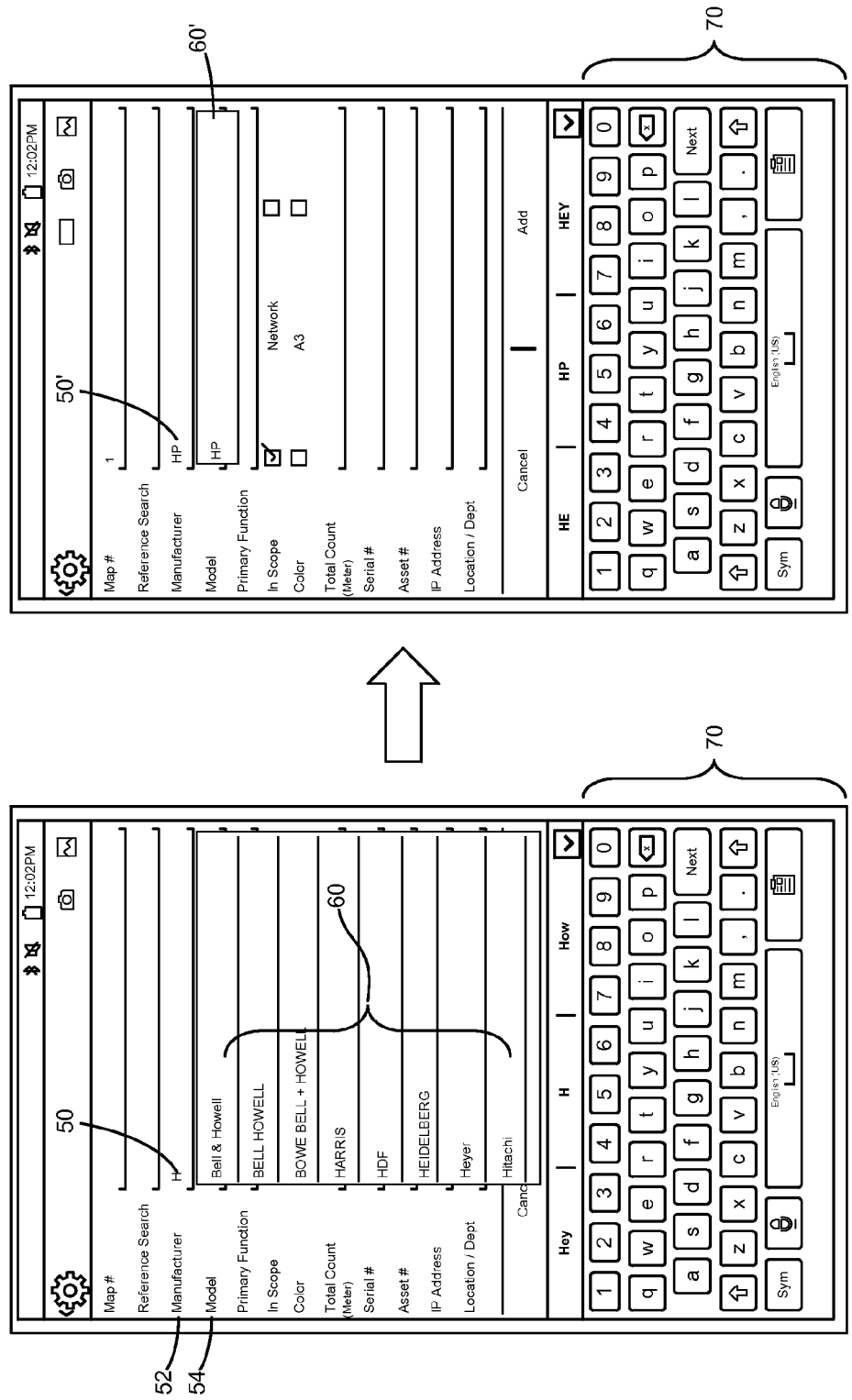
FIGS. 2 and 3 are screen shots of an application on a handheld computing device for a user during a walkthrough past a fleet of disparate imaging devices revealing entry of partial data of imaging devices and in response thereto providing selectable options corresponding to an identity of the imaging devices as reconciled by third party reference data.
Figure 3:
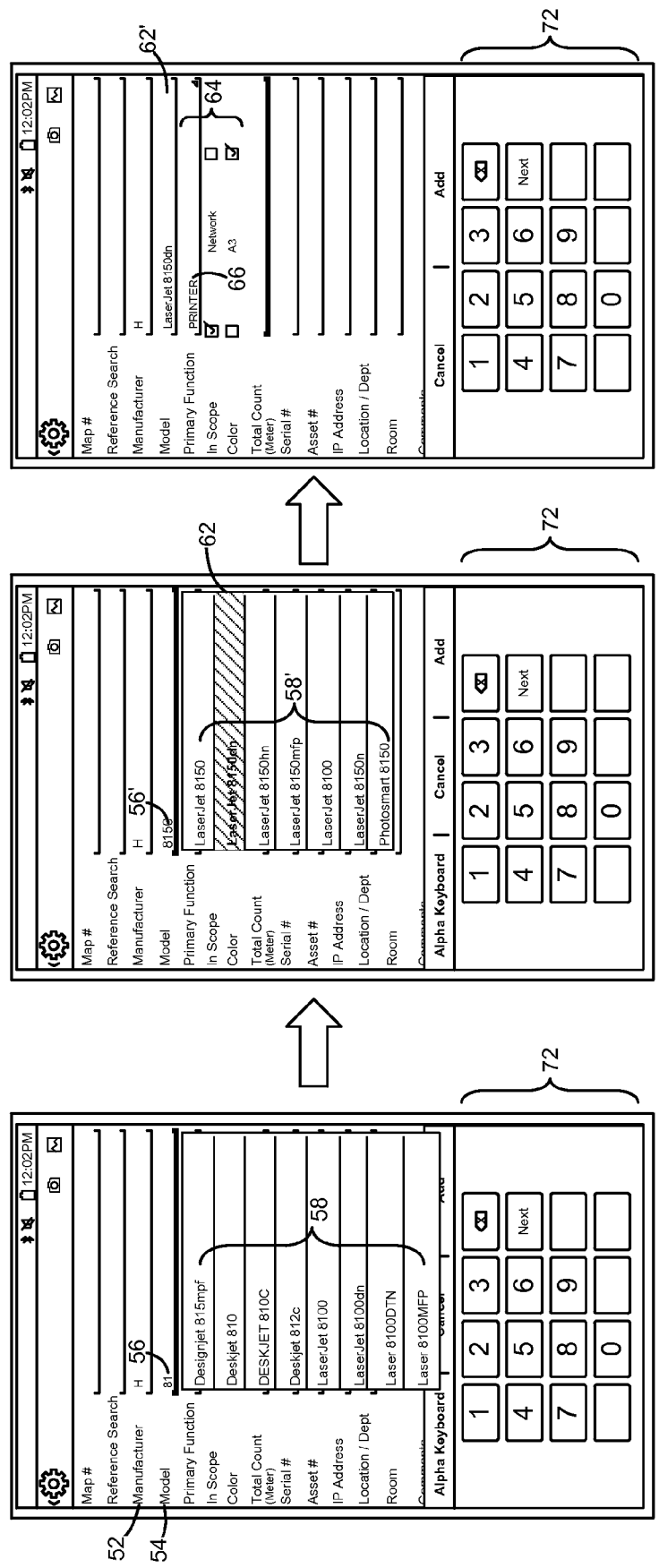

With reference to FIGS. 2 and 3, the user has access to pre-stored manufacturers names and models for varieties of popular imaging devices. In this way, the user establishes correspondence between the imaging devices and reference data provided by Buyers Laboratory, Inc., or other industry guide providing competitive data in the imaging arts. Now, the user no longer has to rely upon test page printouts from imaging devices as noted as a problem in the background section. Instead, the user enters partial data 50 of the imaging device in the Manufacturer 52 field and the application provides selectable options 60 corresponding to an identity of the devices. As the user makes entries, the application compares the values entered to a list of standardized manufacturers and shows the possible results that contain the entered values. The more the user enters data 50', the narrower 60' the selectable options become. This quickly reduces the list of possible results from a few items down to a single item that matches the specified characters.

Similarly, the user enters partial data 56 into the Model 54 field and the application provides selectable options 58 corresponding to an identity thereof. The more the user enters partial data 56', the narrower 58' the selectable options become. Upon the user making an indication 62 of one of the selectable options, the application fills-in the selection 62' into its appropriate field. The user makes their selection at any time.

Other fields, at 64, may be also filled-in automatically at that time as the identification of the manufacturer and model of an imaging device begets additional knowledge of the imaging device, such as its primary function 66, paper size, e.g., A3, color or monochrome device, etc. That the model numbers on many imaging devices are typically numeric-only, whereas the manufacturer name is often identified with alpha-numeric characters, a keyboard displayed to the user switches automatically from alpha-numeric 70 to numeric-only 72 whenever the cursor switches from the Manufacturer 52 to the Model 54 field, and vice versa. The cursor moves automatically upon entry of a field or by user selection.

Figure 4:
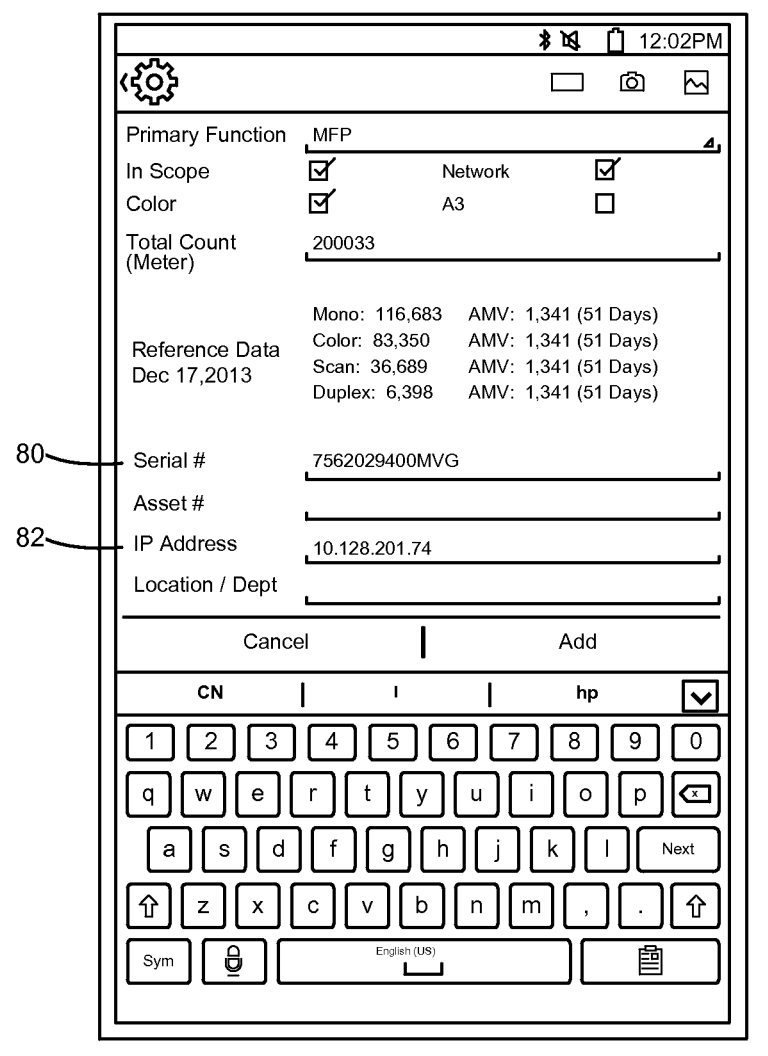

With reference to FIGS. 4 and 5, the user accesses inventories of the imaging devices upon uniquely identifying an imaging device to the application. For instance, when the user enters a device Serial Number 80 or IP address 82 (in part or in whole), the application compares the entered data to the imaging volumes obtained for imaging devices with the log 24, now accessible in memory of the handheld computing device. Upon matching the user's entry to its database, the imaging volumes 90 of the device are displayed to the user. This also includes imaging volumes averaged over a predetermined period of time, such as a day, week, month, year, etc. In this way, the average print volume of a device can be known immediately, allowing the user to factor that information into recommended changes or not to the MPS environment. To note the reliability of the imaging volumes to the user, a confidence factor is displayed.

In a representative embodiment, the imaging volumes include a total number of pages 92 imaged over the lifetime of the imaging device. This value may be further delineated by imaging operations noting mono imaging 94, color imaging 96, imaging by copying or imaging by scanning 98, imaging by faxing (not shown), imaging by duplexing 100, or imaging by paper size, such as A3. These values may be further established as an average 102 (AMV) established over a period of time, thereby denoting a confidence factor 104 for the user. In the present embodiment, if the average estimate is calculated on imaging volumes over a relatively large span of time (30 or more days), the average is likely to be accurate and reliable. But if the average is based on a lesser amount of time, the user can know that the estimate is prone to be less accurate and less reliable. A date 106 may be also displayed that informs the user when the imaging volumes 90 were collected. This also gives the user a level of confidence regarding whether the imaging volumes they are viewing are current or old. Of course, the foregoing values can be customized.

Among the relative advantages that should be now readily apparent to skilled artisans: (1) users can easily and accurately reconcile imaging devices with reference data of third parties while present at devices in question during a walkthrough, thereby avoiding inaccuracies in assessing the imaging infrastructure of fleets of disparate imaging devices; and (2) users can readily associate capacity to specific imaging devices, thereby enabling informed judgments of effective utilization during the walkthrough past the fleet.

The foregoing illustrates various aspects of the invention. It is not intended to be exhaustive. Rather, it is chosen to provide the best illustration of the principles of the invention and its practical application to enable one of ordinary skill in the art to utilize the invention. All modifications and variations are contemplated within the scope of the invention as determined by the appended claims. Relatively apparent modifications include combining one or more features of various embodiments with features of other embodiments.

The invention claimed is:

1. A method of coordinating imaging in a fleet of disparate imaging devices, comprising:
    associating each of the imaging devices to a unique identifier stored in memory of a handheld computing device that a user can carry on a walkthrough past the fleet of disparate imaging devices;
    collecting imaging volumes for a lifetime of said each of the imaging devices in the fleet of disparate imaging devices;
    associating each said unique identifier stored in memory to the imaging volumes collected for said lifetime of said each of the imaging devices;
    averaging the imaging volumes per said each of the imaging devices;
    displaying to the user of the handheld computing device the averaged imaging volumes per said each of the imaging devices; and
    displaying to the user of the handheld computing device a confidence factor that the averaged imaging volumes per said each of the imaging devices are accurate.

2. The method of claim 1, wherein the displaying the confidence factor includes displaying a number of days over which the averaging the imaging volumes occurred.

3. The method of claim 1, wherein the displaying the averaged imaging volumes further includes displaying to the user of the handheld computing device a date on which occurred the collecting the imaging volumes.

4. The method of claim 1, wherein the displaying the averaged imaging volumes further includes displaying to the user of the handheld computing device a total number of pages imaged by said each of the imaging devices.

5. The method of claim 4, further including displaying to the user the total number of pages specified by a number of pages for at least one of the following: mono imaging, color imaging, imaging by copying, imaging by scanning, imaging by faxing, imaging by duplexing, or imaging by paper size.

6. The method of claim 1, wherein the associating said each of the imaging devices to the unique identifier further includes associating said each of the imaging devices to at least one of the following: a manufacturer name, a model number, a serial number, an Internet Protocol (IP) address, or primary function.

7. The method of claim 1, wherein the collecting the imaging volumes for the lifetime of said each of the imaging devices occurs before the walkthrough past the fleet of disparate imaging devices and the imaging volumes are stored in the memory of the handheld computing device.

8. The method of claim 1, wherein the displaying the averaged imaging volumes per said each of the imaging devices occurs on the handheld computing device during the walkthrough by the user past the fleet of disparate imaging devices.

9. The method of claim 1, wherein the displaying the confidence factor occurs on the handheld computing device during the walkthrough by the user past the fleet of disparate imaging devices.

10. The method of claim 1, further including displaying to the user of the handheld computing device a user interface screen for the user to enter partial data of one of the imaging devices and in response thereto for the handheld computing device to provide selectable options corresponding to an identity of said one of the imaging devices.

11. The method of claim 10, further including switching keyboards from alpha-numeric to numeric-only as the user said enters partial data.

12. The method of claim 10, further including receiving from the user a manufacturer name or model number of said one of the imaging devices.

13. The method of claim 10, further including automatically filling-in entries of the user interface screen upon the user making a selection corresponding to the identity of said one of the imaging devices after the selectable options are provided.

14. The method of claim 10, further including pre-storing in the memory of the handheld computing device manufacturer name and model number of a variety of popular imaging devices so the user can establish correspondence between said one of the imaging devices and one of the popular imaging devices stored in said memory.

15. A method of coordinating imaging in a fleet of disparate imaging devices, comprising:
    collecting a total number of pages imaged by each of the imaging devices;
    averaging the total number of pages over a predetermined time period per said each of the imaging devices;
    displaying to a user of a handheld computing device during a walkthrough past the fleet of disparate imaging devices the total number of pages averaged over the predetermined time; and
    displaying to the user of the handheld computing device a confidence factor regarding the total number of pages averaged over the predetermined time.

16. The method of claim 15, further including receiving from the user partial data for one of the imaging devices and in response thereto providing on the handheld computing device selectable options corresponding to an identity of said one of the imaging devices.

17. A handheld computing device, comprising:
    an operating system;
    an application hosted on the operating system for coordinating imaging in a fleet of disparate imaging devices;
    a display responsive to the application that shows to the user a user interface for receiving data from the user; and
    a memory having stored thereon imaging volumes for a lifetime of each of the imaging devices in the fleet of disparate imaging devices, wherein the user interface is configured to receive partial data from the user for one of the imaging devices during a walkthrough past the fleet of disparate imaging devices and in response thereto provides back to the user selectable options corresponding to an identity of said one of the imaging devices and the application is configured to associate each said identity to the imaging volumes collected for the lifetime of said each of the imaging devices.

18. The handheld computing device of claim 17, wherein the memory further stores maps in which the fleet of disparate imaging devices are disposed and the application in response to the user is configured to locate on the map the whereabouts of said each of the imaging devices.

19. The handheld computing device of claim 17, wherein the application is further configured to average the imaging volumes over a predetermined period of time per said each of the imaging devices and the display is configured to show to the user the averaged imaging volumes.

20. The handheld computing device of claim 19, wherein the application is further configured to provide to the user a confidence factor of reliability regarding the averaged imaging volumes.

* * * * *